United States Patent
Fuller et al.

(10) Patent No.: US 12,473,876 B2
(45) Date of Patent: Nov. 18, 2025

(54) EVANESCENT OR FUGACIOUS THRUST DEFLECTOR

(71) Applicant: The Aerospace Corporation, El Segundo, CA (US)

(72) Inventors: Jerome K. Fuller, Van Nuys, CA (US); Denise Galindo Burrell, Culver City, CA (US); Edward V. Wagner, Long Beach, CA (US); Andrew C. Cortopassi, Lakewood, CA (US); Jeffrey Arthur Lang, Torrance, CA (US); Robert B. Pan, Torrance, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 396 days.

(21) Appl. No.: 18/053,294

(22) Filed: Nov. 7, 2022

(65) Prior Publication Data

US 2024/0151194 A1 May 9, 2024

(51) Int. Cl.
*F02K 9/97* (2006.01)
*F02K 9/90* (2006.01)

(52) U.S. Cl.
CPC .............. *F02K 9/974* (2013.01); *F02K 9/90* (2013.01)

(58) Field of Classification Search
CPC .............. F02K 9/90; F02K 9/97; F02K 9/974
See application file for complete search history.

(56) References Cited

U.S. PATENT DOCUMENTS

| | | | | |
|---|---|---|---|---|
| 3,253,403 A * | 5/1966 | Hayes | ..... | F02K 9/974 417/DIG. 1 |
| 3,635,404 A * | 1/1972 | Hopkins | ..... | F02K 9/974 239/DIG. 19 |
| 3,776,466 A * | 12/1973 | Ray | ..... | F02K 9/978 60/909 |
| 5,511,745 A * | 4/1996 | Faupell | ..... | F02K 1/008 239/265.19 |
| 6,548,794 B2 * | 4/2003 | Facciano | ..... | F42B 10/665 244/3.25 |
| 10,527,003 B1 * | 1/2020 | Beck | ..... | B23K 26/342 |
| 11,028,803 B2 * | 6/2021 | Summers | ..... | F02K 9/974 |
| 2003/0094236 A1 * | 5/2003 | Metcalf | ..... | C08K 5/09 156/286 |

* cited by examiner

*Primary Examiner* — Lorne E Meade
(74) *Attorney, Agent, or Firm* — LeonardPatel PC (57) ABSTRACT

An ablative thruster includes a nozzle configured to control a flow of thrust from the satellite. The ablative thruster also includes an ablative surface inside of the nozzle, configured to deflect the thrust at a predefined angle. The ablative surface is configured to ablate-away, leaving un-deflected thrust for a majority of the burn.

6 Claims, 9 Drawing Sheets

Fig. 6C

EVANESCENT OR FUGACIOUS THRUST DEFLECTOR

STATEMENT OF GOVERNMENT INTEREST

This invention was made with government support under Contract No. FA8802-19-C-0001 awarded by the Department of the Air Force. The government has certain rights in the invention.

FIELD

The present invention relates to thrusters, and more particularly, to an evanescent or fugacious thrust deflector.

BACKGROUND

The Federal Communications Commission (FCC) requires that US satellites be deorbited or removed to "parking" orbits at the end of their lifetimes. Small satellites, typically flying in low Earth orbits (LEDs), don't have "parking" orbits and are often degraded and unable to perform additional maneuvers at the end of their lifetimes.

As CubeSats and other small satellites become more pervasive, solutions to remove decommissioned satellites from orbit are essential. A new space company, D-Orbit™, launched a CubeSat otherwise known as D-SAT™, that attempted to lower its orbit through a deorbiting maneuver, but resulted in an orbit-raising maneuver.

Alignment of ammonium perchlorate composite propellant (APCP) motors to a theoretical thrust line running through the satellite's actual center of mass at time of deorbit is extremely difficult. Further, APCP motors build up alumina "slag" in the nozzle throat, in effect, acting as a randomly appearing thrust vector control (TVC) element. Small satellite programs generally cannot accommodate active TVC systems. Reaction wheel steering, designed for typical daily satellite use, usually has insufficient control authority to overcome these problems during a composite solid burn.

Thrust deflectors have been used in TVC systems for many decades, actively directing rocket motor exhaust to create a torque to change or restore a course heading. These systems are necessarily complex and present a monetary cost and system performance cost due to their mass, and in at least many cases, the obstruction of gas flow that would otherwise add to the overall thrust, even when not actively correcting the flight path.

Accordingly, an improved thrust deflector may be beneficial.

SUMMARY

Certain embodiments of the present invention may provide solutions to the problems and needs in the art that have not yet been fully identified, appreciated, or solved by current thrust deflecting technologies. For example, some embodiments of the present invention pertain to an ablative or evanescent or fugacious thrust deflector. For example, some embodiments achieve a passively stable axially-symmetric burn by spinning the satellite, however simple spinning options such as pointing multiple nozzles to create the spin could cause a satellite to spin too quickly by the end of the burn and potentially shred itself. Thus, a spinning technique that is functionally separate from the thrusting motor is desired. Although the use of a spin motor could accomplish this goal, it would also require a separate accommodation with a separate set of risks.

In an embodiment, an ablative thruster includes a nozzle configured to control a flow of thrust from the satellite. The ablative thruster also includes an ablative surface inside of the nozzle, configured to deflect the thrust at a predefined angle. The ablative surface is configured to ablate-away, leaving un-deflected thrust for a majority of the burn.

In another embodiment, an apparatus includes a nozzle configured to control a flow of thrust from the apparatus, and an ablative material inside of or attached to the nozzle, configured to deflect the thrust at a predefined angle. The ablative material being configured to ablate-away, leaving un-deflected thrust for a majority of the burn. The apparatus also includes fugacious material configured to ablate-away, melt-away, or be removed by ablating or melting a portion of a supporting structure of the fugacious material. In another embodiment, The apparatus includes a meltable deflector attached to the inside of the nozzle using a meltable interface material. The meltable deflector is composed of a ceramic material or a metal, and is composed of polymers, elastomers, metals, or alloys.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a thrust deflector that ablates-away or melts away, or is eroded, leaving only un-deflected thrust for the majority of the burn. One configuration is suitable for tractor motors while a different configuration accommodates conventional axial-thrust motors. In some embodiments, the deflector may be located in the nozzle or exhaust plume. Also, in some embodiment, the thrust deflector (or fugacious surface) is configured to ablate away, leaving substantially undeflected thrust for a majority of the burn. Substantially, for purposes of explanation, means that there be an insignificant bit (e.g., less than 5 percent) of deflection remaining, since the remnants of the deflector may still be present.

For embodiments that pertain to tractor motors, a partial plug is affixed to the nozzle cone using an adhesive. The shape of the plug directs the thrust to one side, applying a torque. These motors generally have multiple nozzles with each nozzle applying similar torques in opposing pairs. The nozzle is made of an ablative material that ablates away at a predictable rate such that two radially-opposed nozzles would provide similar torques for similar periods. The torque may reduce in effect as the obstructing material is removed.

It should be appreciated that there may be ways other than ablation to accomplish removal of the obstructing material. For example, melting a plastic deflector may also work. Though undesirable because of the debris generated, a deflector made of ceramic, metal or another durable material may also be made to separate from the nozzle after a delay, perhaps by conducting heat to a meltable interface material between deflector and the nozzle or other part of the structure. Interface materials, which may melt or decompose in order to release a deflector, may include thermoplastic polymers (e.g., polyethylene or acrylonitrile butadiene styrene (ABS)), thermoset materials (e.g., polyimide) cross-linked materials (e.g., epoxy or rubber), elastomers (e.g., urethane and thermoplastic elastomer (TPE)). Ablation, however, may be another technique. For example, attachment of a fugacious element to parts of the nozzle, or to other spacecraft or rocket structures, could additionally be made by welding, the use of fasteners, or even by the use of interlocking features. In some embodiments, the fugacious element may include elements that are fabricated as a single part or placed within one or more other parts.

It should be appreciated that other materials may decompose without melting and may be used in the some of the embodiments described herein. Such materials may include thermoset plastics, rubbers, and epoxies all of which can decompose without melting, still releasing a deflector.

It should also be noted that there's no specific need to attach the deflector part to the nozzle. The same result may be achieved by attaching the deflector to other parts. For example, the deflector may be mounted on the nozzle because that is where the device can be the smallest, but it may be more convenient to mount a deflector to elements of an engine mount or motor mount.

For embodiments that pertain to axially thrusting motors, an annulus with a set of curved blades, arranged around the motor centerline but beyond the nozzle diameter, mounts thrust deflectors made of an ablative material. The cover is ablated away leaving the motor plume to exhaust normally without applying further torque. The time spent spinning up versus thrusting normally is determined by the thickness, material, and shape of the deflector.

Figure 1:
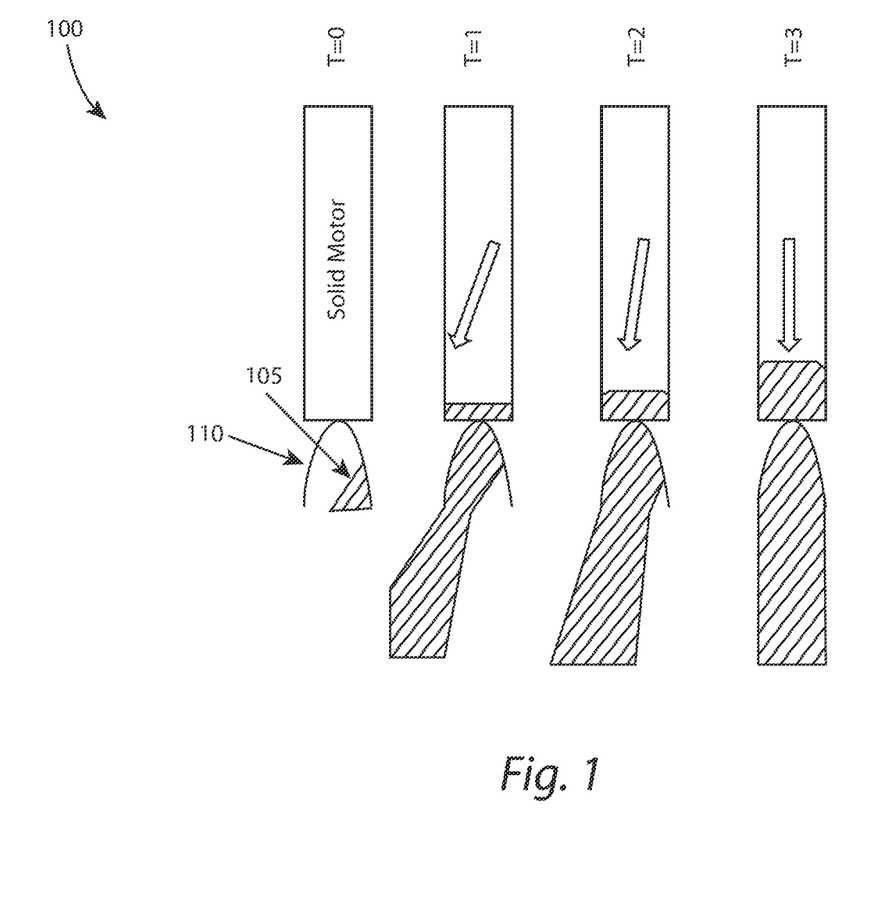
FIG. 1 is a diagram illustrating a tractor motor comprising a deflector inserted within a nozzle at time 0 to time 3, according to an embodiment of the present invention.

FIG. 1 is a diagram illustrating a tractor motor 100 comprising a deflector 105 inserted within a nozzle 110 at time 0 to time 3, according to an embodiment of the present invention. In some embodiments, deflective (material) 105 is attached to the inside of a nozzle 110 by way of adhesive or some other material. In some embodiments, the adhesive is filled with additives to modify the ablation rate (e.g., an epoxy filled with ceramic particles).

Depending on the embodiment, thrust deflectors may be attached to nozzles by epoxy adhesive or by mechanical fasteners. In other embodiments, thrust deflectors may also be attached to other portions of the spacecraft, such as the rocket motor structure or the spacecraft structure, for temporarily deflecting the thrust. Thrust deflectors may also be attached to portions of a nozzle, including the converging, throat, or diverging portion of a nozzle, or to the nozzle bell or may be extended beyond the nozzle. They could be attached to other portions of the rocket motor or spacecraft body. Attachment methods could include mechanical fasteners, mechanical keying with interlocking features, adhesives or meltable layers, or by welding or chemical welding. Deflectors can be molded, cast, 3D-printed, or otherwise concurrently or monolithically fabricated, with a nozzle or other nozzle component. In this example, a nozzle might be designed with the deflector being a designed-in feature rather than a separate part requiring attachment.

Fugacious deflectors may include a plurality of elements. These elements may include one or more planar shapes that cap a nozzle to force gas products through other elements (e.g., curved vanes). Other elements, such as conical shapes, may aid in turning the flow of gas more efficiently. These shapes may be combined into a single piece or assembled using various joining techniques. These elements may further comprise supporting structures or timing features, such as a pilot hole, that provides an initiation point for ablation or melting. A typical rocket motor or engine, firing axially (as opposed to a tractor), may employ a vane set and deflecting plate such that the plate prevents axial thrust, in part or in total, while allowing a torqueing thrust, until the deflecting plate is ablated or melted away, or is released by the ablating or stressing of a securing component.

Deflector 105 may deflect the thrust partially or gradually from tractor motor 100. Since a tractor motor 100 includes multiple nozzles, ablative deflector 105 may be inside of each nozzle 110. It should be noted that the current state of the art does not take into consideration the ablation in terms of timing to change from the side to thrusting straight down. See, for example, FIG. 1.

Using FIG. 1 as an example, assume there are four to eight nozzles 110, each of which include a deflective material 105 positioned on a CubeSat. In this example, if there is a single fuel grain that is providing gases to all of the nozzles at the same time, there may be rotation around the long axis of the CubeSat. With this configuration, there is a timing feature, i.e., a passive TVC rather than an active TVC.

Figure 2:
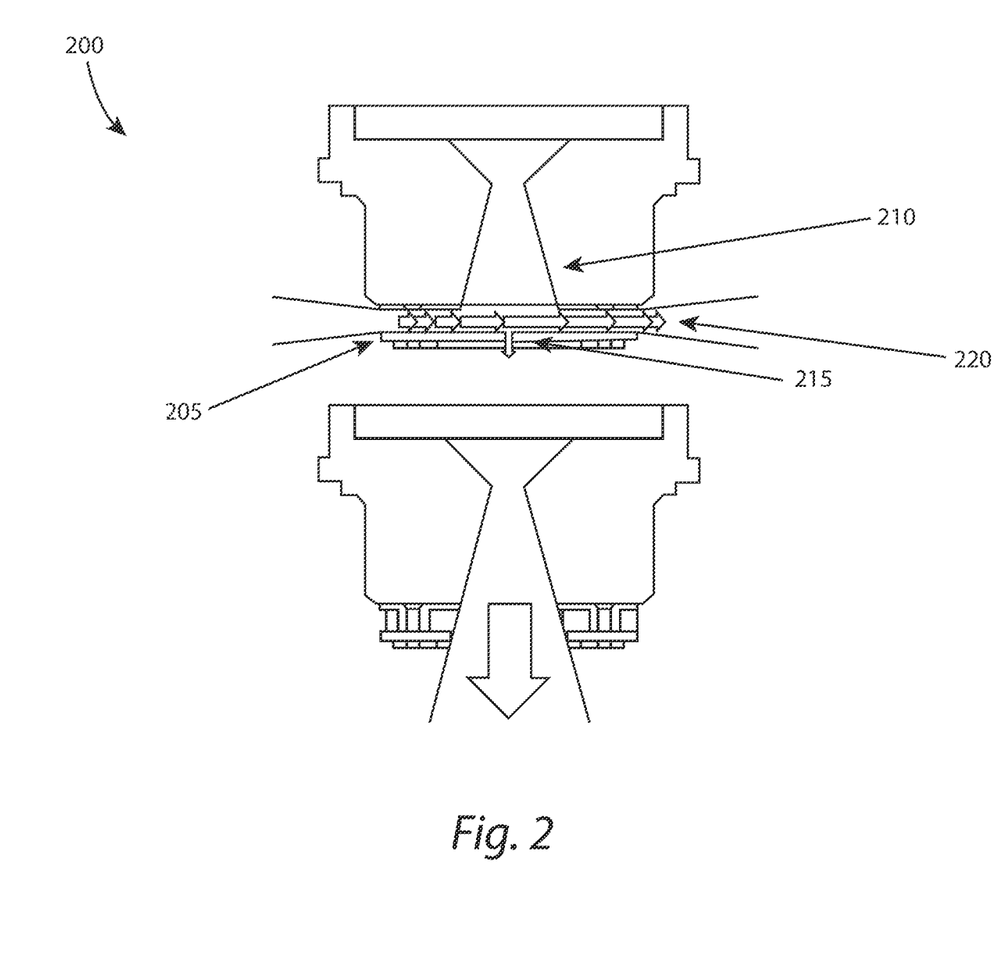
FIG. 2 is a diagram illustrating an axial motor comprising of an ablative disc inserted within a nozzle 210, according to an embodiment of the present invention.

FIG. 2 is a diagram illustrating an axial motor 200 comprising of an ablative disc 205 inserted within a nozzle 210, according to an embodiment of the present invention. In this embodiment, there is a single nozzle 210 that is on axis with the fuel grain and the rest of the CubeSat, and an ablative disc 205 with a hole 215 in the center. The hole in this embodiment is configured to act as a timing feature. With this configuration, the thrust is deflected initially out of the veins 220 with very little thrust exiting from hole 215. Over time, the thrust exits out through the hole as the hole enlarges. The ablative disc 205 may be composed of polyimide plastic, for example.

Other materials may include other thermoset plastic materials, or thermoformed plastic materials, metals, composite materials (e.g., phenolic) or fiberglass, ceramic materials (e.g., alumina), semiconductor materials (e.g., silicon or silicon carbide), or carbon or hardened resins (e.g., epoxy). These materials may be formed by machining, molding, casting, 3D printing, or by laying-up or combining various materials, made by various methods.

A rocket using an aerospike nozzle may employ a fugacious thrust deflector or a fugacious element temporarily securing a thrust deflector. A deflecting element placed in the exiting flow of gasses can be oriented to deflect the gasses to produce a torque. In the case of annular aerospike nozzles, it can be convenient to attach a disk-like fugacious element at the tip of the spike so that curved or canted vanes or blades that are attached to or part of the disk redirect the axial thrust laterally while also directing the thrust into opposing tangential thrust components. The disk shape may include a hub shape that extends forms an extension to the spike. Similarly, a more robust thrust deflecting element may be made fugacious, by attaching the thrust deflecting element by fugacious means. One embodiment of this might be at least one meltable polymer element, such as a nylon fastener, so that conduction of heat through the nozzle or deflector or hot gasses might melt, or allow to be removed, an element securing the deflector.

Figure 3:
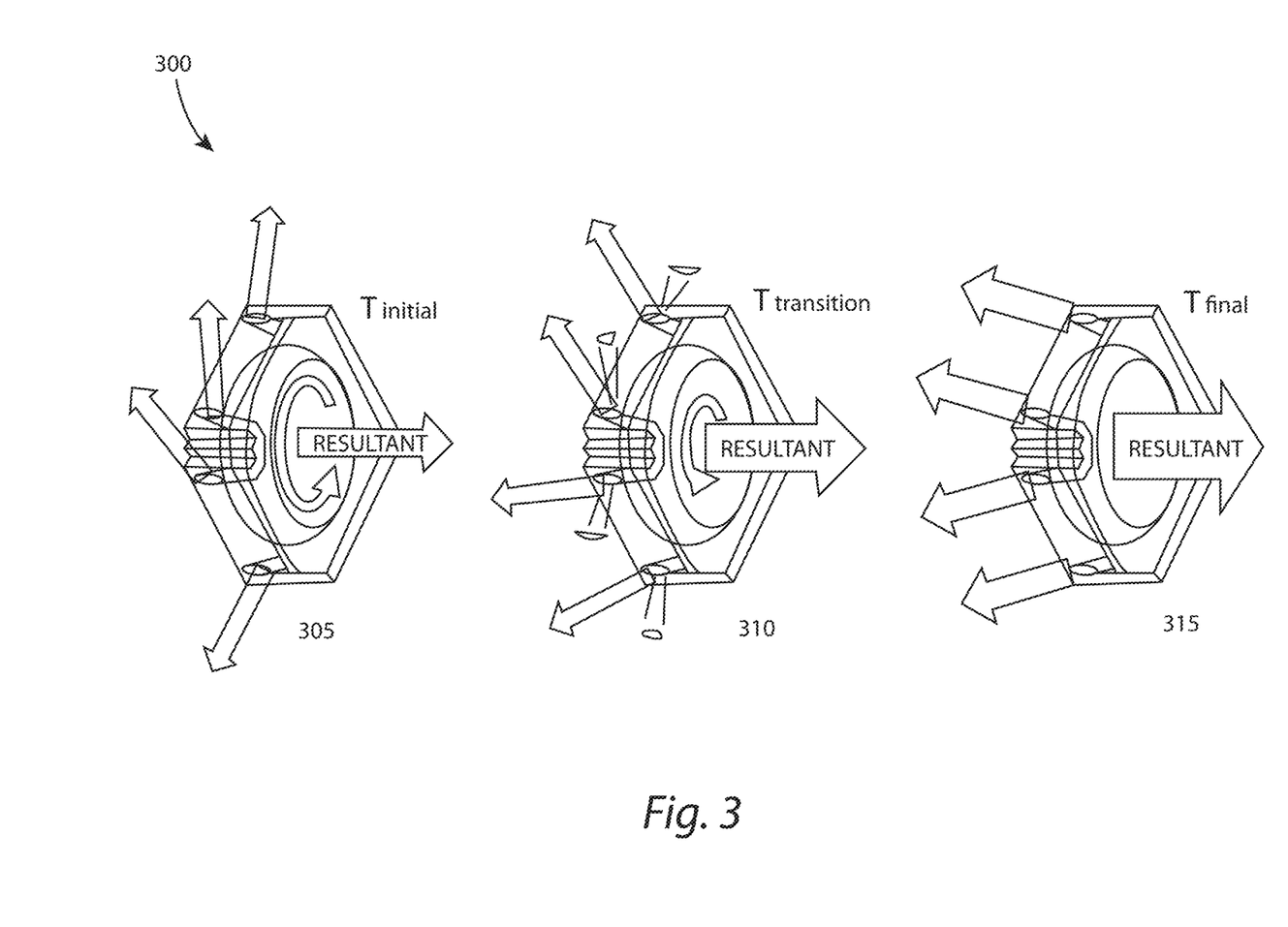
FIG. 3 is a diagram illustrating a tractor motor comprising an ablative deflector 305 at time $T_{Initial}$ to time $T_{Final}$, according to an embodiment of the present invention.

FIG. 3 is a diagram illustrating a tractor motor 300 comprising an ablative deflector 305 at time $T_{Initial}$ to time $T_{Final}$, according to an embodiment of the present invention. In this embodiment, tractor motor 300 includes ablative deflectors 305 inside of nozzles 310. Nozzles 310 are attached to or connected to an end-burning fuel grain 315.

In FIG. 3, tractor motor 300 includes eight fugacious thrust deflectors. The thrust deflects are partly adhered to, and partly occluding, their associated nozzles such that during they at least partly deflect thrust laterally at $T_{initial}$, before ablating away at $T_{final}$, where the nozzles direct the thrust at least mostly downward.

Figure 4:
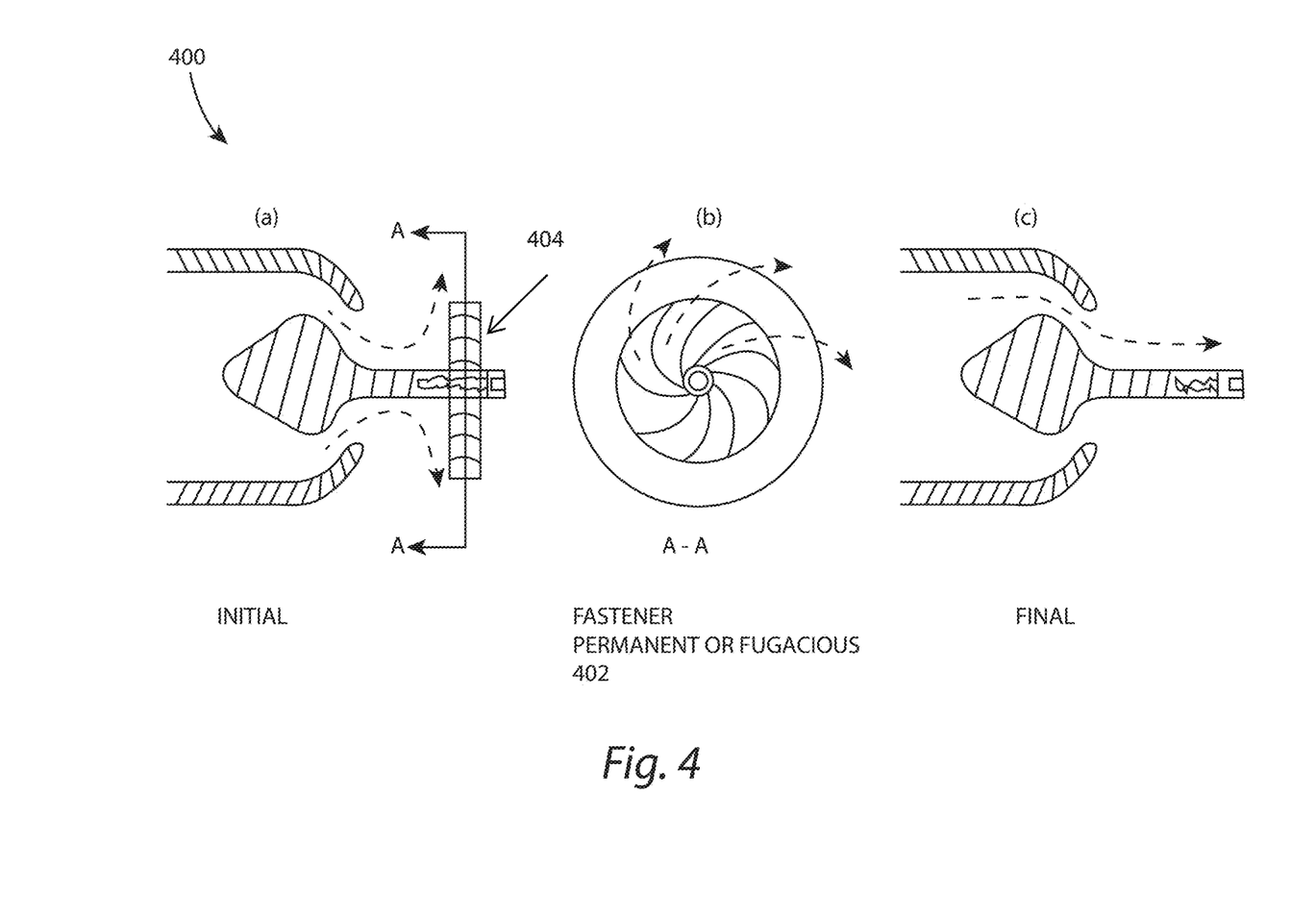
FIG. 4 illustrates diagrams (a)-(c) showing a cross-section of an aerospike nozzle furnished with a fugacious thrust deflector in the initial condition (a), according to an embodiment of the present invention.

FIG. 4 illustrates diagrams (a)-(c) showing a cross-section of an aerospike nozzle furnished with a fugacious thrust deflector in the initial condition (a), according to an embodiment of the present invention. In some embodiments, 4(a) shows how thrust is initially deflected tangentially. A fastener or fugacious material (e.g., nylon) 402 is used to attach deflector 404. For example, in this simple example, the fastener or fugacious material is secured to a threaded hole in the end of a spike, either with a meltable bolt so the entire component can be removed at once or so the deflector itself ablates away, leaving the bolt intact. In reality, there may be a circle of many bolts.

FIG. 4(b) shows a view (A-A) of the curved vanes of the deflector and some of the tangentially exiting gasses, and FIG. 4(c) shows the final condition after the deflector is burned-away.

Figure 5A:
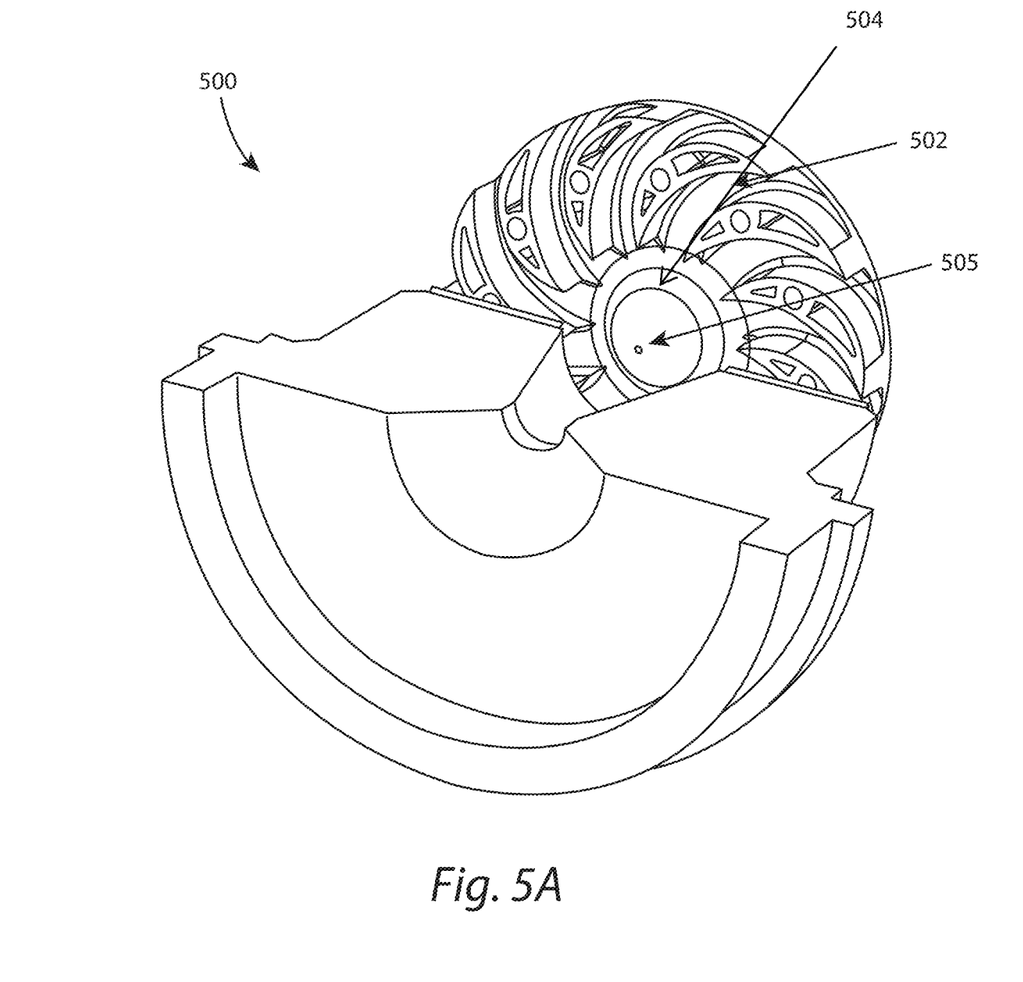
FIGS. 5A and 5B are diagrams illustrating different views of a printed ceramic deflector, according to an embodiment of the present invention.
Figure 5B:
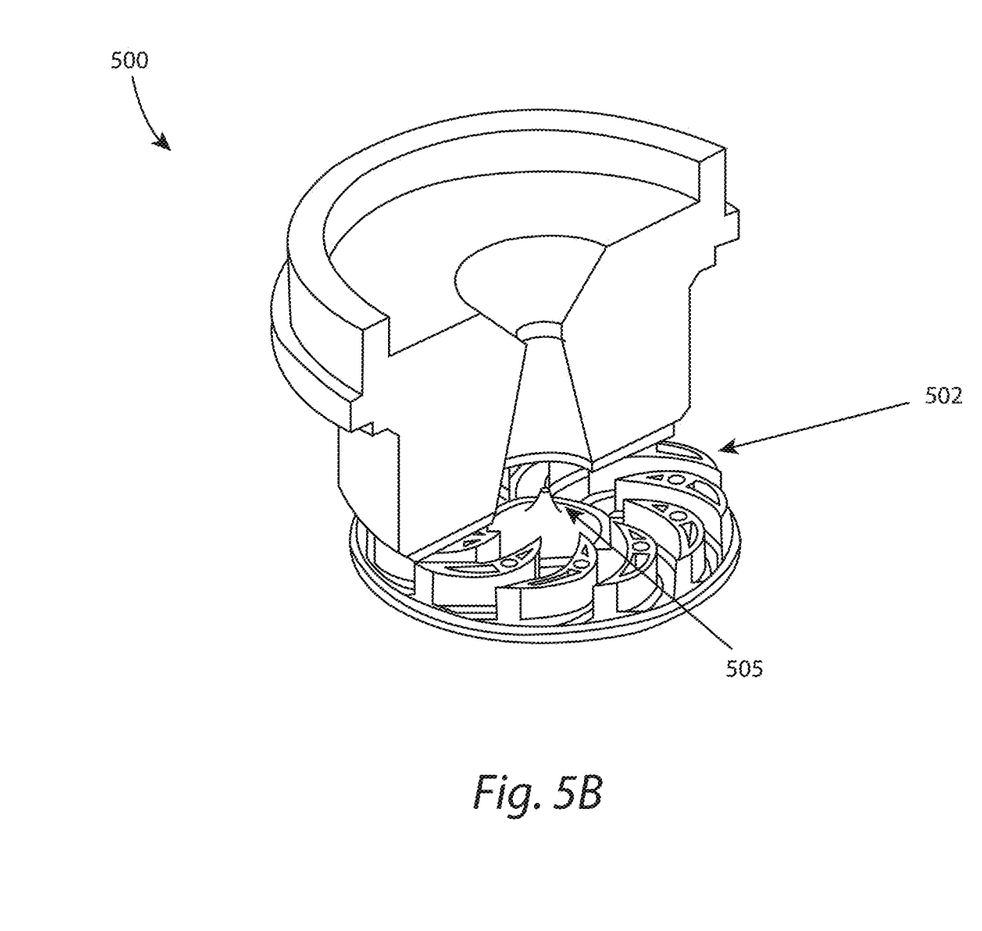

FIGS. 5A and 5B are diagrams illustrating different views of a printed ceramic deflector 500, according to an embodiment of the present invention. In some embodiment printed ceramic deflector 500 includes a plurality of vanes 502 and capping surface 504. Both FIGS. 5A and 5B show an alternative arrangement whereby the through-hole 505 of an annulus mounting curved vanes is mostly or completely occluded. In this embodiment, the base surface that mounts the curved blades is positioned away from the nozzle. As the motor burns, the combustion gasses ablate or erode a thin member at the center or open a small hole 505 at the center of disk 500, allowing axial thrusting after producing a torque.

Figure 6A:
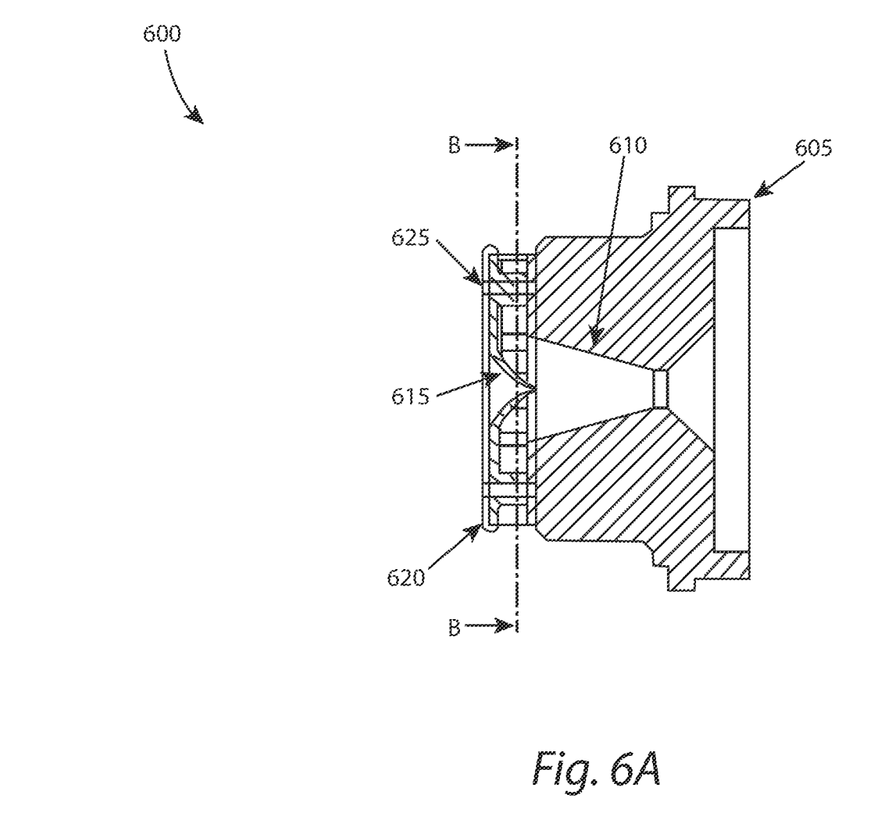
FIGS. 6A-C are diagrams illustrating a one-piece design where the fugacious element and the torque vanes are monolithic, according to an embodiment of the present invention.
Figure 6B:
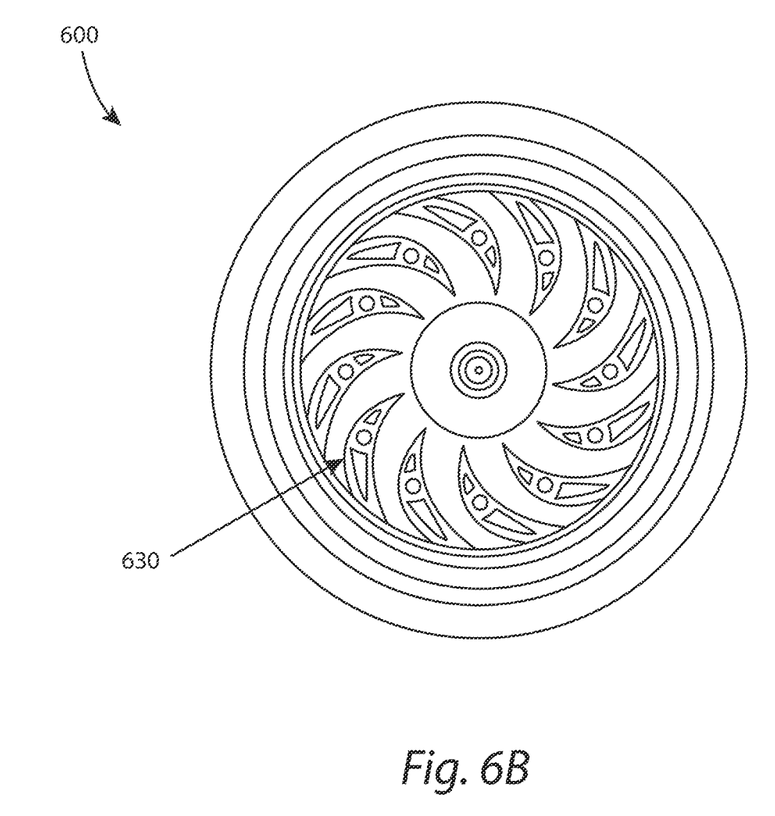
Figure 6C:
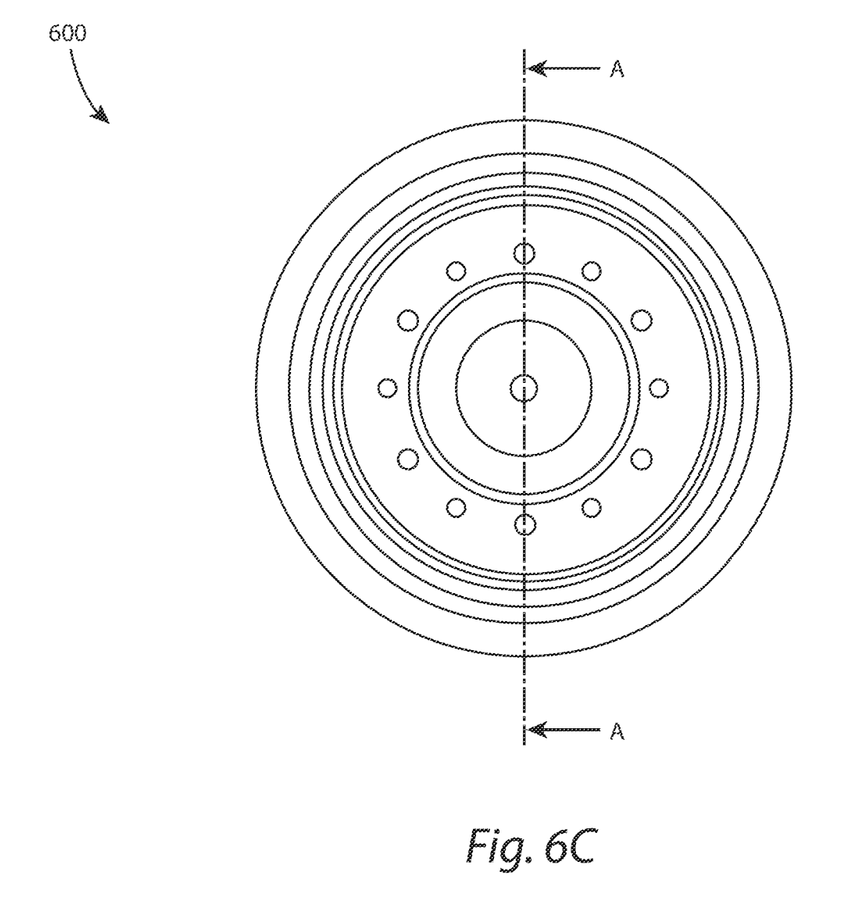

FIGS. 6A-C are diagrams illustrating a one-piece design where the fugacious element and the torque vanes are monolithic, according to an embodiment of the present invention. In FIG. 6A, cross-section of thrust deflector 600 shows a nozzle 605 with a nozzle diverging section 610. Adjacent to, or on the outside side of, thrust deflector 600 is a fugacious cone 615 with a retaining ring 620 and through-hole fasteners 625. In FIG. 6B, torque vanes 630 are shown.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a nozzle configured to control a flow of thrust from the apparatus; and
an ablative material inside of or attached to the nozzle, the ablative material configured to initially deflect the thrust at a predefined angle, wherein
the ablative material is configured to ablate-away, leaving un-deflected thrust for a majority of the burn,
the ablative material comprises a hole in the center and the hole is positioned axially to an un-deflected thrust direction of the nozzle, the ablative material together with the hole are configured to act as a timing feature, increasing a flow of thrust through the hole as the hole ablates away.

2. The apparatus of claim 1, wherein the flow of thrust is a rocket exhaust plume, wherein initially deflecting the thrust at a predefined angle creates a torque that spins the apparatus before the hole is enlarged by ablation by the rocket exhaust plume.

3. The apparatus of claim 1, wherein the nozzle is manufactured by way of machining, additive manufacturing, three dimensional (3D) printing, or casting or injection molding.

4. An apparatus, comprising:
a nozzle configured to control a flow of thrust from the apparatus; and
an ablative material inside of or attached to the nozzle, the ablative material configured to initially deflect the thrust at a predefined angle through a plurality of curved vanes, wherein
the ablative material being configured to ablate-away, leaving un-deflected thrust for a majority of the burn,
wherein the ablative material comprises a hole in the center and the hole is positioned axially to an un-deflected thrust direction of the nozzle,
the ablative material together with the hole are configured to act as a timing feature, increasing a flow of thrust through the hole as the hole ablates away.

5. The apparatus of claim 4, wherein the flow of thrust is a rocket exhaust plume, wherein initially deflecting the thrust at a predefined angle through a plurality of curved vanes creates a torque that spins the apparatus before the hole is enlarged by ablation by the rocket exhaust plume.

6. The apparatus of claim 5, wherein the nozzle is manufactured by way of machining, additive manufacturing, three dimensional (3D) printing, or casting or injection molding.

* * * * *